July 11, 1972  H. EDWARDS  3,676,265
MANUFACTURE OF LAMINATED ARTICLES
Filed June 16, 1970  2 Sheets-Sheet 1

INVENTORS
HARRY EDWARDS
BY Cushman, Darby & Cushman
ATTORNEYS

July 11, 1972   H. EDWARDS   3,676,265
MANUFACTURE OF LAMINATED ARTICLES
Filed June 16, 1970   2 Sheets-Sheet 2

INVENTORS
HARRY EDWARDS

United States Patent Office 3,676,265
Patented July 11, 1972

3,676,265
MANUFACTURE OF LAMINATED ARTICLES
Harry Edwards, Manchester, England, assignor to Imperial Chemical Industries Limited, London, England
Filed June 16, 1970, Ser. No. 46,740
Claims priority, application Great Britain, June 17, 1969, 30,617/69
Int. Cl. A23c *3/00;* B29b *5/04*
U.S. Cl. 156—500                                    9 Claims

ABSTRACT OF THE DISCLOSURE

Apparatus for the continuous manufacture of laminated foam articles, comprising a foam dispensing means for applying foam-forming ingredients to sheet material which is to form one of the facings of the laminate and a conveying means for causing that sheet together with another sheet which is to form the other facing to move parallel to each other while the foam core is formed between them, the conveying means consisting of upper and lower parts one or both of which can move up or down with respect to the other part and exerting a predetermined constant pressure on the components of the laminate. The conveying means is characterised in that each of its movable parts comprises an endless series of slats mounted parallel to one another and transversely to their direction of motion and each independently carried on one or more endless chains by means whereby each slat is yieldingly urged outwardly from the chain or chains into contact with a sheet of facing material. The apparatus is of particular value for the production of laminated articles in which at least one of the facing sheets is pre-formed with lateral flanges, ridges or other convex configurations.

---

This invention relates to the manufacture of laminated articles and more particularly to the continuous manufacture of laminated articles having a plastic or resinous foam core.

In U.S. patent application Ser. No. 847,227, there is described and claimed an apparatus for the continuous manufacture of laminated articles having a plastic or resinous foam core sandwiched between and bonded to two outer sheets of facing material which comprises a foam dispensing means for applying a liquid mixture of foam-forming ingredients to one of the sheets of facing material and a conveying means for causing the two sheets of facing material to move in parallel relationship with each other while formation and setting of the foam core takes place, the said conveying means being characterised in that it exerts a predetermined constant pressure on the foam.

One form of the apparatus so defined incorporates a conveying means which consists of two parts, a fixed lower part and an upper part which is arranged to float upon the components of the laminated article being manufactured, each of the said parts comprising a conveying surface such as an endless belt which transmits motion to the lower and upper facing materials respectively, the upper conveying surface being backed in its region of contact with the laminated article by a stationary platen which preferably has longitudinal flexibility, for example by virtue of its being constructed from a series of linked plates or slats.

In such apparatus, the endless belt conveying surface is normally arranged to be of a width which is somewhat greater than that of the facing materials used in making the laminate; in this way it is ensured that the facing material remains continuously in contact over its whole width with the adjacent belt surface, notwithstanding any slight irregularities in the tracking of the belt, that is to say any tendency for the belt to deviate laterally during the course of its longitudinal motion. This arrangement is satisfactory when the upper and lower facings are completely flat, but for certain applications it is desired to manufacture continuously laminated articles in which one or both facings are rigid and are laterally bounded by convex configurations such as flanges, ribs, ridges or the like. In such articles, the facing materials may themselves be pre-formed so as to have such convex lateral regions, or the facing materials may be of the normal flat type but may be arranged to lie between edge strips having convex parts which remain upstanding from the facing material in the finished laminate, such edge strips becoming bonded to the foam core. Under these circumstances, the conveying surfaces of the apparatus are no longer able to exert pressure uniformly over the whole width of the facing materials but instead ride mainly upon the convex lateral regions of the facings.

This difficulty can to some extent be overcome by limiting the width of the conveying surface so that it can ride in between the convex lateral regions and is thus once more brought into contact with the planar regions of the facing material, but this arrangement has drawbacks which arise from the tendency already mentioned of an endless belt conveying surface to deviate laterally when in motion. In the case where a facing is bounded on both sides by convex regions, there is a risk that the belt may become seized up between them and, in the case where there is a convex region to only one side of the facing, the belt is liable to veer away from that region from time to time, so that small peripheral regions of the facing material are no longer subject to the pressure transmitted by the conveying surface and the thickness of the laminate in those regions cannot then be accurately controlled.

A modified form of the apparatus of U.S. patent application Ser. No. 847,227 has now been devised whereby this disadvantage may be overcome.

According to the present invention there is provided apparatus as claimed in U.S. patent application Ser. No. 847,227, wherein the conveying means which exerts a predetermined constant pressure on the foam consists of upper and lower parts at least one of which can move up or down with respect to the other part, each said movable part of the conveying means comprising an endless series of slats mounted parallel to one another and transversely to their direction of motion, the slats being independently carried upon at least one endless chain or like endless driving means by means whereby each slat is yieldingly urged outwardly from the chain or chains.

Preferably the slats of each such movable part of the conveying means are carried upon two endless chains, one located to each side of the series of slats, so that uniform motion of the slats is achieved. Each slat is in this case preferably carried upon transversely coresponding links of the two chains, and consecutive slats are carried upon consecutive links of each chain, or upon alternate links, as may be convenient.

The means whereby each slat is carried upon the links of the chain or chains and is yieldingly urged outwardly therefrom may conveniently comprise spring means. Such means may consist, for example, of one or more leaf springs attached at one extremity to transverse bars which extend between and are fixed to alternate corresponding links of the two endless chains and at the other extremity to the slat, or attached at both extremities to such transverse bars and intermediately to the slat.

It is, however, preferred that the means for carrying the slat should be capable of adjustment so that the pressure exerted by each individual slat on the facing sheet of the laminate may be controlled, and more particularly so that the pressures exerted by the individual slats may be adjusted so as to uniformly equal. Such adjustable means may consist, for example, of helical springs carried on threaded bolts or pins passing through the slat and through brackets attached to the chain links in which the bolts or pins are retained in place by an adjustable nut, the spring being compressed between the slat and the bracket to an extent determined by the relative position of the nut. By such means the vertical position of each slat relative to the endless chain or chains may also be adjusted.

Other suitable adjustable means for carrying the slats consists of a hydraulic piston and cylinder linking each slat to an adjacent chain link, suitable rotary connections being provided whereby controlled hydraulic pressure may be conveyed to the individual pistons and cylinders.

The pressure exerted by the slats may vary between 2 oz./in.$^2$ and 2 lb./in.$^2$; is preferred. Where the above-described arrangement of helical springs and adjustable bolts and nuts is employed, the desired range of pressure may be obtained by spring selection and by adjustment of the pre-compression of the springs by means of the nut; it is preferred that each bolt should be capable of a vertical range of movement within and relative to the link bracket of about 1".

In those applications of the apparatus of the present invention where it is required that only one of the parts of the conveying means should be a vetricaly movable, endless series of slats as hereinbefore described, the other, fixed part of the conveying means may be any of the types already known and described in U.S. application Ser. No. 847,227 that is to say they may contain a conveying surface such as an endless belt to apply motion to the facing material into which they come in contact, or they may contain a series of parallel rollers which contact the facing material. A conveying surface may be backed in its region of contact with the facing material by a platen, or by a series of parallel rollers as described in British specification No. 1,098,472. However, a preferred form of the fixed part of such a conveying means consists of an endless series of slats similar to those employed in the movable part hereinbefore described, that is to say a series of slats mounted parallel to one another and transversely to their direction of motion and carried upon at least one endless chain or like endless driving means, and preferably upon two such chains, one at each side of the slats, but differing in that the slats of this fixed part of the conveying means are carried upon the chain or chains in substantially rigid fashion. Means for adjusting the vertical position of each slat relative to the chain or chains may, however, advantageously be incorporated.

It will be understood that the manner of operation of the apparatus of the present invention is essentially similar to that of the form of apparatus previously mentioned and particularly described in U.S. application Ser. No. 847,227 that is to say, in the case where it is the upper part of the conveying means that is verticaly movable, that part floats upon the components of the laminated article being manufactured. However, whereas in the latter apparatus the floating action arises from a stationary platen which is flexible or yieldable in the longitudinal dimension and is transmitted to the components of the laminates through a moving endless conveying surface, in the present apparatus the endless conveying means itself is arranged to have this flexible or yieldable character. The advantage which is thereby conferred is that the motion of a floating conveying means according to the invention is capable of being more accurately controlled, in particular that there is little or no tendency for such conveying means to deviate laterally while in motion, by virtue of the precise lateral location of the endless chain or chains, or other driving means, upon which the slats are carried. In the case where it is the lower part of the conveying means that is vertically movable, the same effect obtains but in the opposite sense.

The width of the slats incorporated in the apparatus of the invention will, in those instances where a facing material is bounded on both sides by convex regions as aforesaid, preferably be equal to the width of the planar region of the facing material, so that the slats are enabled to ride in between such convex regions and so to make uniform contact with the planar region of the material. In those instances where a facing material is bounded by a convex region on one side only, the slats may be of a width equal to or greater than that of the facing sheet, but will be so located that they move in close proximity to the convex region so as to remain always in contact with the facing sheet along the boundary of that region.

The apparatus of the invention may, of course, be employed in the manufacture of laminated articles the upper facing of which is completely flat. However, whilst the results obtained in such a case are equally satisfactory to those obtained by the use of the previously-described form of the apparatus as claimed in U.S. application Ser. No. 847,227 the more complex construction of the present apparatus recommends that it be used particularly for the manufacture of those types of laminated article, already referred to, for which the previous form of the apparatus is unsuitable.

As in the apparatus described and claimed in U.S. application Ser. No. 847,227, the apparatus of the present invention may incorporate means for heating the components of the laminated article so as to modify the rate of formation and setting of the foam core. Heating may be accomplished by methods already known in themselves, preferably by applying radiant heat from infra-red heaters. Such heat may be applied to the slats of the movable part of the conveying means, and also if desired, particularly where the fixed part of the conveying means includes series of parallel rollers, directly to the facings of the laminate.

The laminated articles with which this invention is concerned have a plastic or resinous foam core sandwiched between and bonded to two outer sheets of facing material. The plastic or resinous foam core may be formed from any suitable foam-forming composition and may be either flexible or rigid. It is particularly preferred, however, that the foam core consists of polyurethane. The polyurethane may be obtained in known manner from a suitable mixture of polyurethane-forming ingredients such as polyesters or polyethers containing hydroxyl groups and polyisocyanates together as desired, with water, catalysts, surfactants, blowing agents and other ingredients. The facing materials may be composed of lengths or sheets of any suitable materials such as, for example, paper, wood, plastic, metal, rubber, paperboard, plasterboard or asbestos. Both of the sheets of facing material may be flexible or both may be rigid and may be the same or different, or one may be flexible and the other rigid.

The apparatus of the invention is of particular value for the production of laminated articles in which at least one of the facing sheets is of material, such as metal, which has been pre-formed, e.g. by rolling, so as to have lateral flanges, ridges or other convex configurations. If desired such a preforming process may immediately precede the actual laminating process carried out in the apparatus of the invention. Thus laminated panels useful in the construction of refrigerator bodies may be produced on a continuous basis by rolling a metal sheet into the form of a shallow tray, the upstanding sides of which have inwardly-turned stepped flanges, depositing a layer of foam-forming composition into the tray, bringing a thin sheet of flexible material, such as expanded polystyrene, into contact with the upper surface of the foam layer so that the edges of the flexible sheet rest between the steps of the flanges of the tray, and then allowing the foam-forming reaction to proceed to completion so as to give a box-like laminate which may be cut into conveniently sized lengths.

By way of illustration there will now be described, with reference to the accompanying drawings, an embodiment of the apparatus of the invention in which the vertically movable part of the conveying means is the upper part thereof and the lower, fixed part is of the preferred form hereinbefore described. In the drawings.

Figure 1:
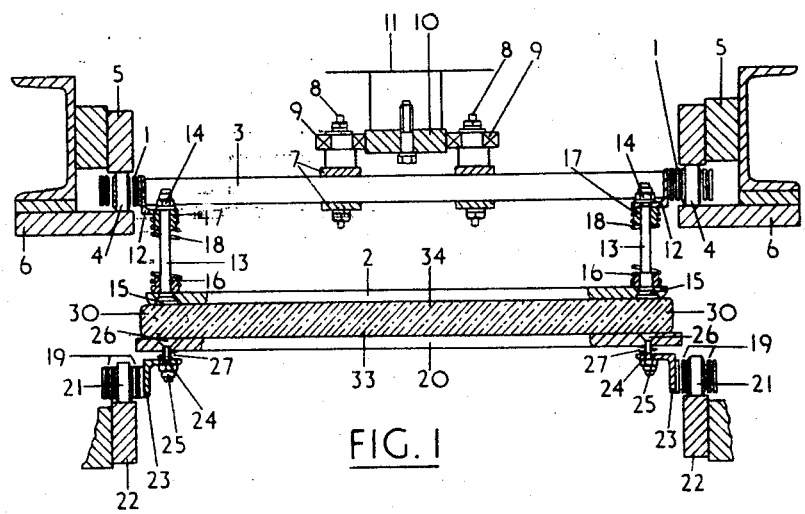
FIG. 1 is a transverse cross-section of the upper and lower parts of the conveying means of the apparatus.

The upper part of the conveying means consists essentially of two laterally spaced endless chains 1 upon which there is carried a series of slats 2; for the sake of clarity only the lower run of each chain is shown. The two chains are interconnected by transverse rods 3 which constitute inward extensions of the link pins of the chains; the link pins themselves form bearings upon which rollers 4 are mounted. The rollers are located between guide rails 5 and 6 which extend throughout the length of the horizontal run of the chains and are attached to the frame of the apparatus; the upper rails 5 are ground accurately to horizontality. Adjacent pairs of the transverse rods 3 are interconnected close to their mid-points by clamping bars 7, the retaining bolts 8 of which are upwardly extended to carry horizontal rollers 9. The rollers 9 are located one to each side of a guide rail 10 which also extends throughout the length of the horizontal run of the chains 1 and is secured to the frame of the apparatus (indicated at 11). Each chain link carries a pair of inwardly facing brackets 12; the horizontal arm of each bracket has an aperture within which a bolt 13 is a sliding fit and is retained by an adjustable nut 14. The head 15 of each bolt is countersunk within a slat 2 and is retained therein by a threaded collar 16. Each bolt 13 also carries a second collar 17 which is a sliding fit thereon and is located in a conical seating formed in the underside of the bracket 12, and a compression spring 18 is fitted between the collars on each bolt.

The lower part of the conveying means consists of a pair of endless chains 19 carrying a series of slats 20 similar to those of the upper part. The link pins of the chains 19 carry rollers 21 which bear against guide rails 22 accurately ground to horizontality; in this case, however, the links of the two chains are not interconnected by transverse rods. Each link of a chain 19 carries the brackets 23 similar to the brackets 12 and through the horizontal arm of each bracket there passes a bolt 24 retained in place by an adjustable nut 25. The head 26 of each bolt 24 is countersunk within a slat 20, which in turn is spaced from the bracket 23 by a pair of Belleville washers 27.

Figure 3:
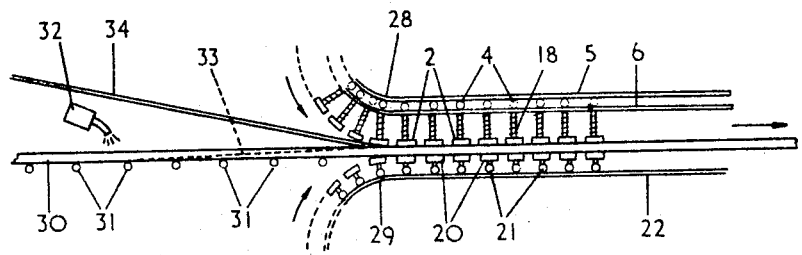
FIG. 3 is a general diagrammatic longitudinal elevation of the apparatus showing the relative location of the upper and lower parts of the conveying means.
Figure 2:
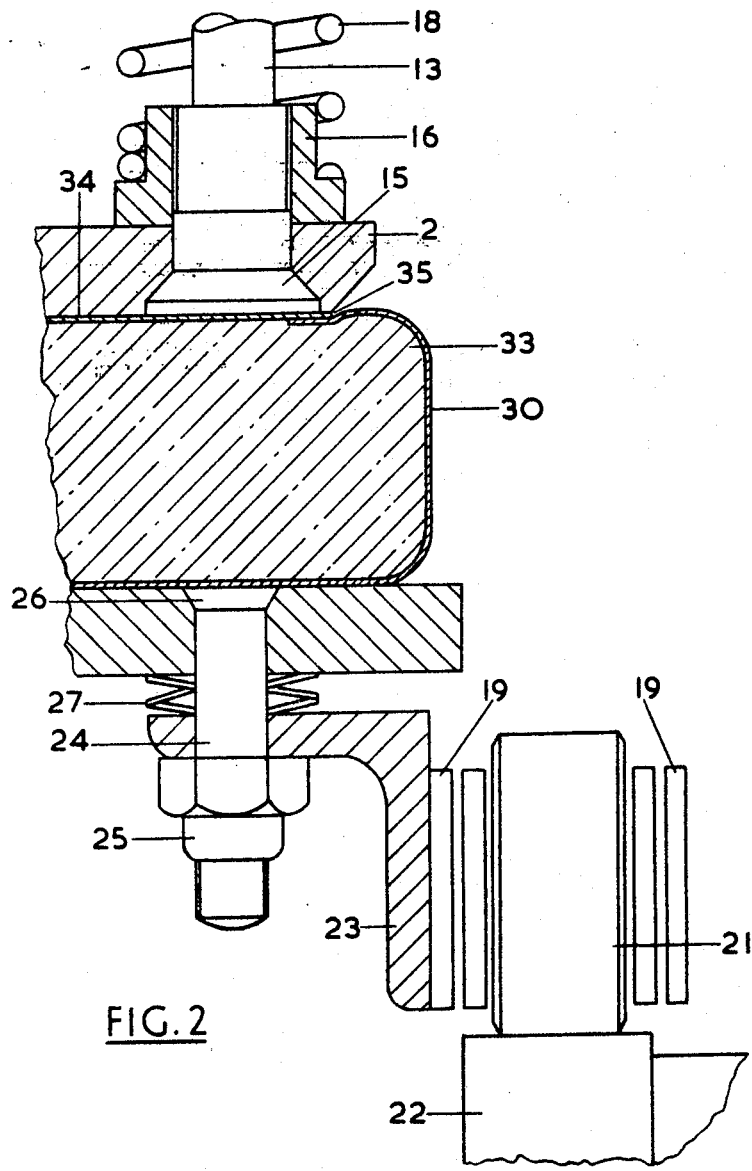
FIG. 2 is an enlarged view of a portion of the cross-section of FIG. 1, showing the arrangement of the slats relative to the laminated article being manufactured in greater detail.

As shown in FIG. 3, the upper and lower parts of the conveying means, indicated generally by 28 and 29 respectively, form a nip between which the components of a laminated article may be drawn, the lower run of the upper part contacting the upper facing of the laminate and the upper run of the lower part contacting the lower facing. The lower facing is shown as a continuous channel-shaped metal pressing 30 which, before it is drawn into the nip, is supported upon a series of polypropylene rollers 31. During its passage over these rollers, the pressing 30 receives from a traversing dispensing means 32 a layer 33 of ingredients for forming a polyurethane foam. A thin sheet of expanded polystyrene 34 is continuously brought into contact with the upper surface of the layer 33 so that the sheet is accurately located within the steps 35 (FIG. 2) of the flanged parts of the pressing 30, and the laminate thus formed then passes continuously forward into the nip above-mentioned, where completion of the formation of the foam core takes place.

I claim:

1. In an apparatus for the continuous manufacture of laminated articles having a plastic or resinous foam core sandwiched between and bonded to two outer sheets of facing material which comprises a foam dispensing means for applying a liquid mixture of foam-forming ingredients to one of the sheets of facing material and a conveying means for causing the two sheets of facing material to move in constant parallel relationship with each other while formation and setting of the foam core takes place between them, the said conveying means consisting of upper and lower parts at least one of which can move up or down with respect to the other part and exerting a predetermined constant pressure on the components of the laminate, the improvement which consists in that each said movable part of the conveying means comprises at least one endless driving means, an endless series of parallel slats and means for mounting the slats upon said driving means transversely to their direction of motion so that each slat is yieldingly urged outwardly from the said driving means into contact with a sheet of facing material.

2. Apparatus as claimed in claim 1, wherein the endless driving means is an endless chain.

3. Apparatus as claimed in claim 1, wherein the slats of each movable part of the conveying means are carried upon two endless chains, one located to each side side of the series of slats.

4. Apparatus as claimed in claim 3, wherein each slat is carried upon transversely corresponding links of the two endless chains.

5. Apparatus as claimed in claim 1, wherein the means for mounting the slats upon the driving means is capable of adjustment so that the pressure exerted by each individual slat on the facing sheet of the laminate may be controlled.

6. Apparatus as claimed in claim 5, wherein the adjustable mounting means comprises a helical spring the degree of compression of which can be varied.

7. Apparatus as claimed in claim 1, wherein the pressure exerted by the slats on the facing sheets of the laminate lies in the range 2 oz./in.$^2$ to 2 lb./in.$^2$.

8. Apparatus as claimed in claim 7, wherein the pressure exerted by the slats is 1 lb./in.$^2$.

9. Apparatus as claimed in claim 1, wherein one only of the upper and lower parts of the conveying means is vertically movable and the other, fixed, part of the conveying means comprises at least one endless driving and a series of slats mounted substantially rigidly upon the said driving means parallel to one another and transversely to their direction of motion.

References Cited

UNITED STATES PATENTS 3,208,103   9/1965   Voelker _____ 18—6
2,928,219   3/1960   Gubler _____ 150—151

DOUGLAS J. DRUMMOND, Primary Examiner

U.S. Cl. X.R.

100—151; 156—582